UNITED STATES PATENT OFFICE.

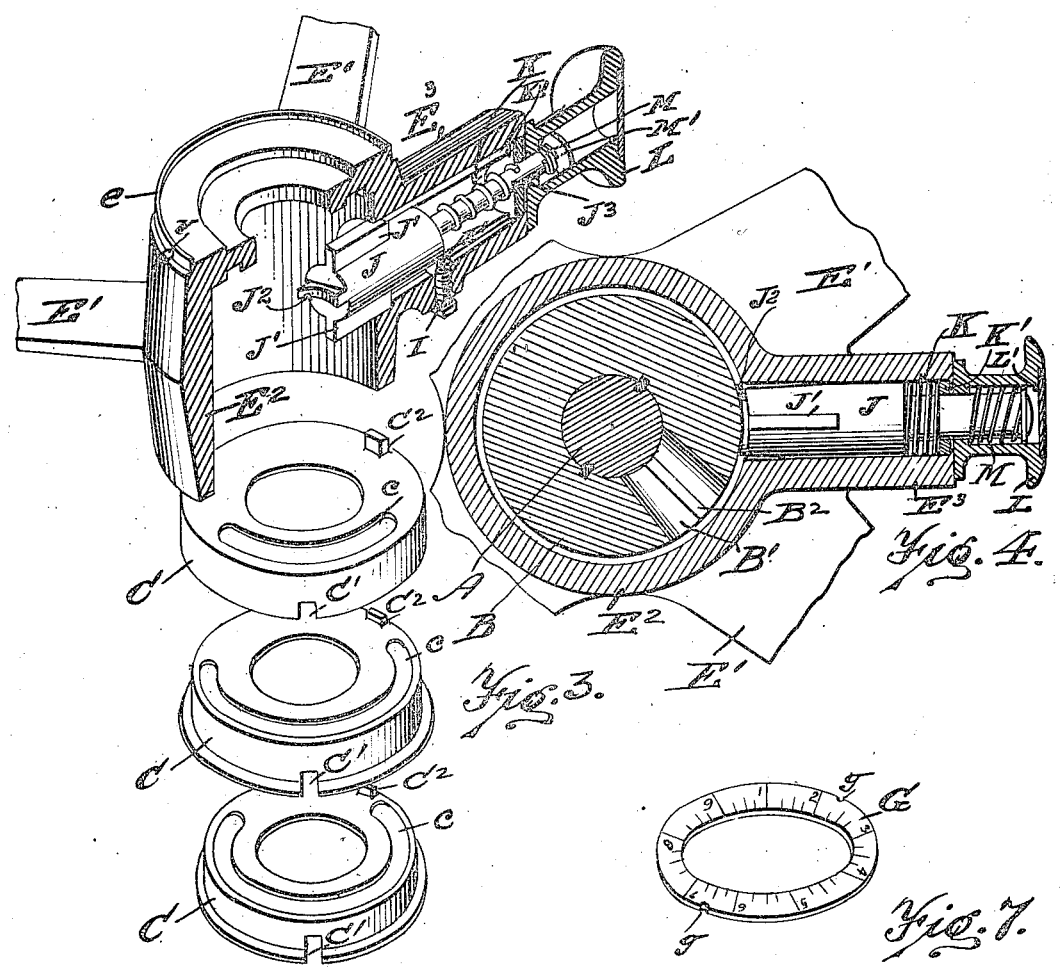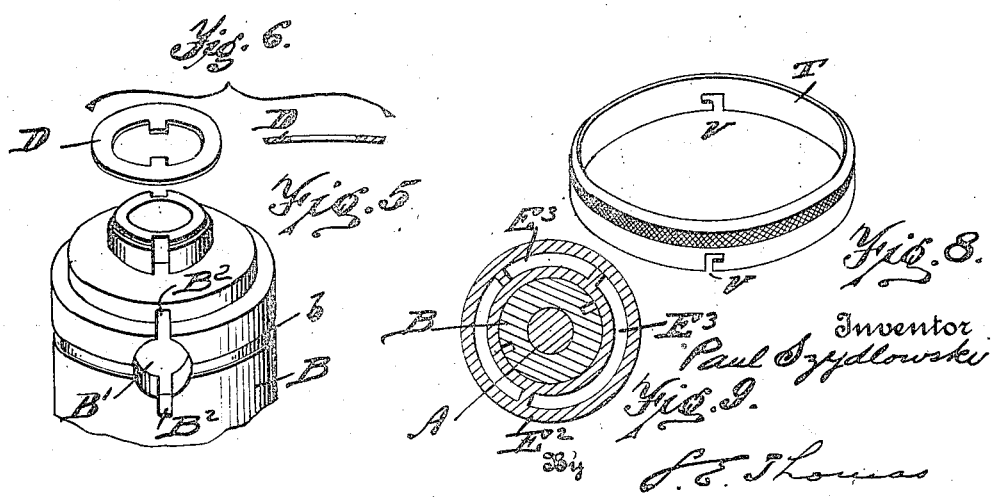

PAUL SZYDLOWSKI, OF DETROIT, MICHIGAN.

STEERING-WHEEL LOCK FOR MOTOR-DRIVEN VEHICLES.

1,322,736.   Specification of Letters Patent.   Patented Nov. 25, 1919.

Application filed May 14, 1919. Serial No. 297,011.

*To all whom it may concern:*

Be it known that I, PAUL SZYDLOWSKI, a citizen of the United States, residing at Detroit, county of Wayne, State of Michigan, have invented a certain new and useful Improvement in Steering-Wheel Locks for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to steering wheel locks for motor driven vehicles, and is designed as an improvement on my invention described and claimed in Patent No. 1,267,476, dated May 28, 1918.

Among other objects of the present invention is a simplified construction and reduced manufacturing cost while providing at the same time a more efficient device which cannot be readily tampered with or put out of order.

One feature of the present invention consists in providing means whereby the hub of the steering wheel cannot be removed from the head of the steering post by an unauthorized person,—due to the action of a tongue which projects from the end of the spring actuated bolt (serving to lock the steering wheel in operative relation to the post) into a peripheral groove in the head, and thus while the hub of the steering wheel may freely turn upon the head, it cannot be removed therefrom.

Another feature of the invention consists in constructing the outer wall of the steering wheel hub in a tapering form, so that a wrench cannot be applied to the hub to squeeze its wall into impinging relation with the enlarged head on the top of the steering post, in order to steer the car, when the steering wheel has been released by the owner from operative control of the steering post.

Another feature of the invention is the manner of securing the concentrically arranged graduated rings so they may maintain their predetermined coöperative relation to each other.

With the foregoing and other objects in view, which will appear as the description proceeds, the invention resides in the combination and arrangement of parts and in the details of construction hereinafter described and claimed, it being understood that changes may be made in the precise embodiment of the invention herein shown without departing from the spirit of the same.

In the drawings accompanying this specification:—

Fig. 3 is a perspective-sectional view through the steering wheel hub—showing a plurality of slotted inverted cup-shaped elements adapted to be nested together within the hub to control the action of the spring actuated bolt.

Fig. 4 is a horizontal sectional view through the hub of the steering wheel, the steering post, and the locking post.

Fig. 5 is a fragmentary perspective view of the locking head carried by the steering post.

Fig. 6 are perspective and cross-sectional detail views of the spring washer lodged between each of the cup-shaped disks of the locking mechanism.

Fig. 7 is a perspective view of the outer graduated ring of the locking mechanism, showing the indentations in its edge to receive the indented rim of the steering wheel hub to secure it in fixed relation to the latter.

Fig. 8 is a perspective view of the collar,— secured by a bayonet fastening to the hub— for supporting the crystal of the graduated dial.

Fig. 9 is a cross-sectional view through the hub on line 9—9 of Fig. 2,—looking in the direction of the arrows.

Figure 1:
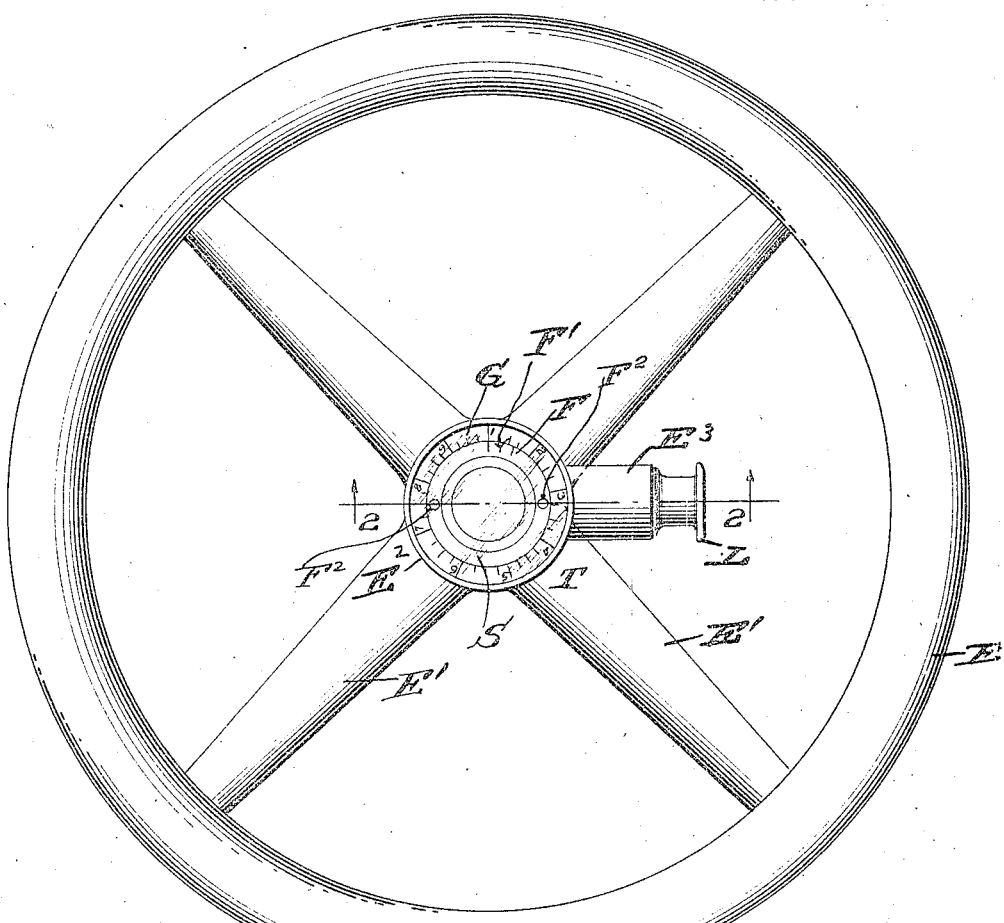
Figure 1 is a plan view of a steering wheel showing the graduated dial of the locking mechanism.
Figure 2:
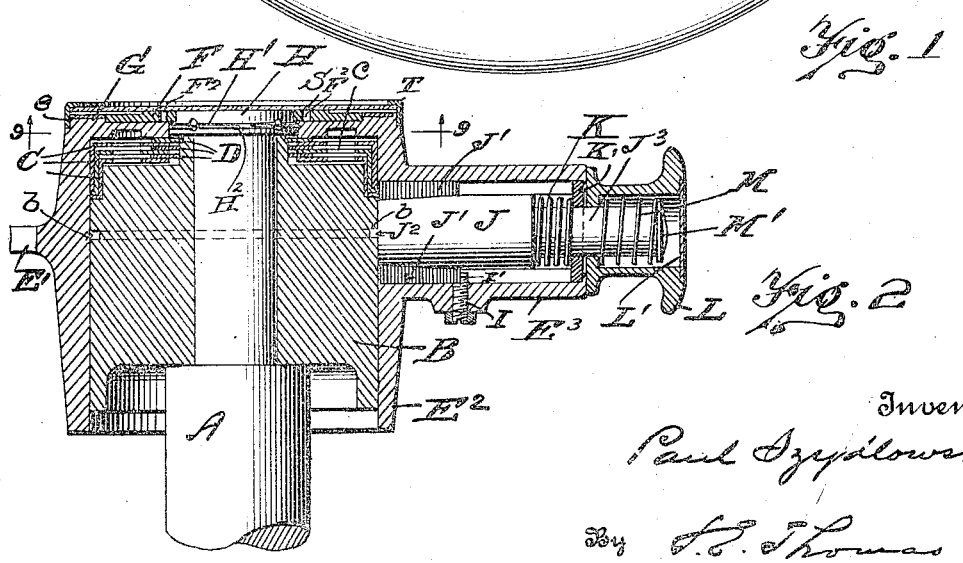
Fig. 2 is a vertical sectional view through the steering wheel hub and locking bolt.

Referring now to the letters of reference placed upon the drawings:—

A, denotes a steering post of a motor driven vehicle, to the upper end of which is keyed an enlarged head B, provided with a stepped upper face over which is mounted a plurality of rotatable inverted annular cup-shaped elements C, nested together and having co-acting arc-shaped slots *c*, of varying length as indicated in Fig. 3, of the drawings.

D, indicates a spring washer located between the respective cup-shaped elements, keyed to the enlarged head, to insure against their rotation with the elements C.

B', indicates a transverse hole formed in the head tapering slightly toward the steering post from which extend radially projecting slots B². C', indicates slots in the side wall of each of the cup-shaped elements C, which are designed to be brought into opposition with the slots B². upon the rotation of the elements C, as will hereafter be explained.

C², designates a lug integral with each of the cup-shaped elements respectively adapted when the parts are nested together to enter the slot c, of the superimposed cup-shaped element.

E, designates a steering wheel. E', are its spokes and E², is its hub adapted to fit over the enlarged head B, of the post.

E³, denotes arc-shaped channels (see Fig. 9) on the underside of the wall of the hub E², to receive the lug C², of the upper cup-shaped element C, whereby the several elements C, may be adjusted upon the rotation of the steering wheel.

G, is an annular graduated ring lodged in a recess formed in the upper wall of the hub E², and secured thereto by indenting the upstanding rim e, of the hub into corresponding depressions g, g, in the edge of the ring G, that it may rotate with the steering wheel.

F, is an annular disk, provided with a plurality of graduations F', employed in conjunction with the graduations on the ring G, for adjusting the locking mechanism.

H, is a stepped circular nut adapted for adjustment by a spanner wrench secured to the upper end of the post and completely filling the central opening in the disk F. When the parts are assembled and the nut is in place, its outer edge h, is burred into a recess formed in the face of the disk F, to secure the latter to the nut. To provide against the nut turning when adjusted an annular shaped wire spring H', is lodged in a peripheral groove in the nut H, having an inwardly directed end H², extending through a radial hole in the nut that the end of the wire may impinge against the threads of the post A, thereby securing the nut in its adjusted position.

Projecting from the inclined outer wall of the hub E², is a sleeve E³, having a tapering inner wall. Housed within the sleeve E³, is a spring actuated bolt J, from which extends radial fins J', adapted to enter the slots B², radially extending from the transverse hole B', in the enlarged head of the steering post. I, is a bolt screwed transversely into the wall of the sleeve E³,—having its inner end cut away as indicated at I', to form a shoulder against which the end of the fin J', bears to prevent the withdrawal of the spring actuated bolt when the steering wheel is free to turn upon the post.

The transverse bolt I, is so positioned in the wall of the sleeve that the projecting tongue J², on the end of the spring actuated bolt J, cannot be withdrawn from the peripheral groove b, formed in the enlarged head of the steering post,—while free to turn thereon. It will also be noted that the transverse bolt I, cannot be unscrewed while the fin J', of the spring actuated bolt bears against the flattened or cut away end of the transverse bolt.

K, is a spring coiled around the projecting stem J³, of the spring actuated bolt,— one end of which bears against a shoulder between the bolt and its projecting stem, while the other end bears against a washer K', at the end of the sleeve E³, in turn held in position by "burring" over the end of said sleeve.

Mounted on the stem J³, is a slidable knob L, held against the end of the sleeve by a spring M, coiled around the stem of the bolt and bearing at one end against the wall of the knob; its opposite end bearing against a disk M', secured to the stem of the bolt.

L', is a disk secured to the knob to close the opening into the latter.

Figure 10:
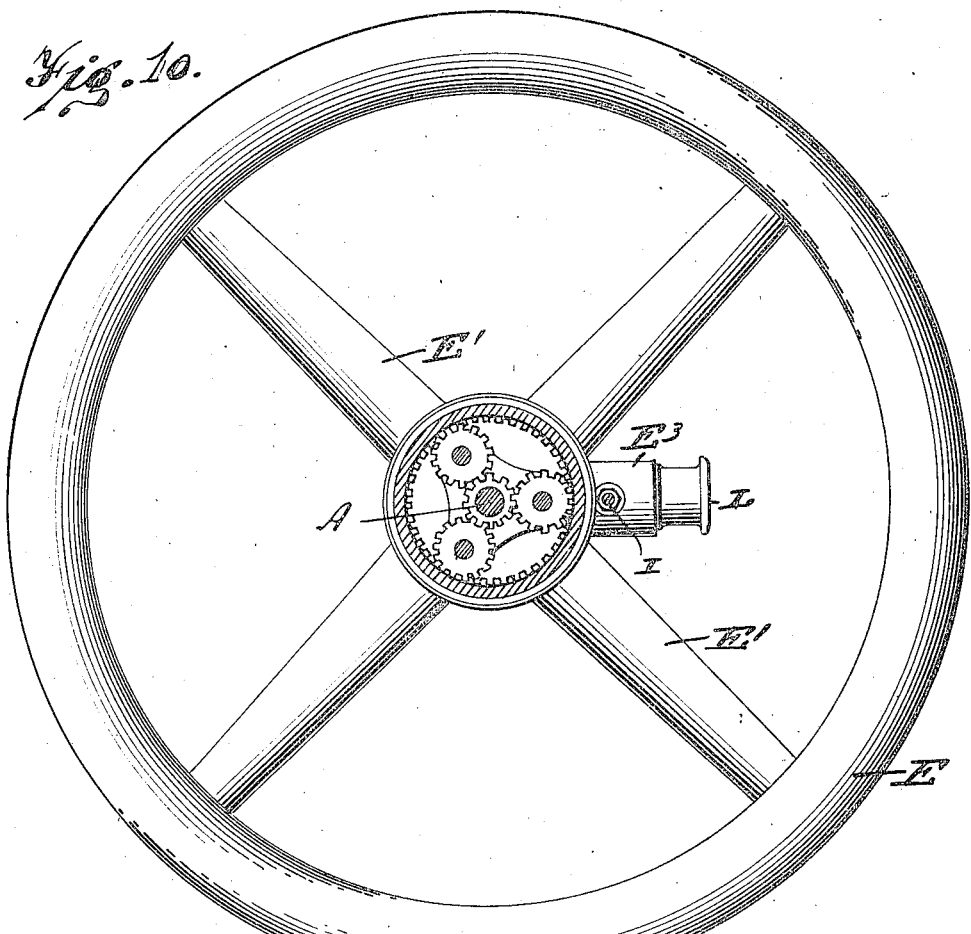
Fig. 10 is a plan view—partly in section of a steering wheel of the "Ford" type with my invention applied thereto.
Figure 11:
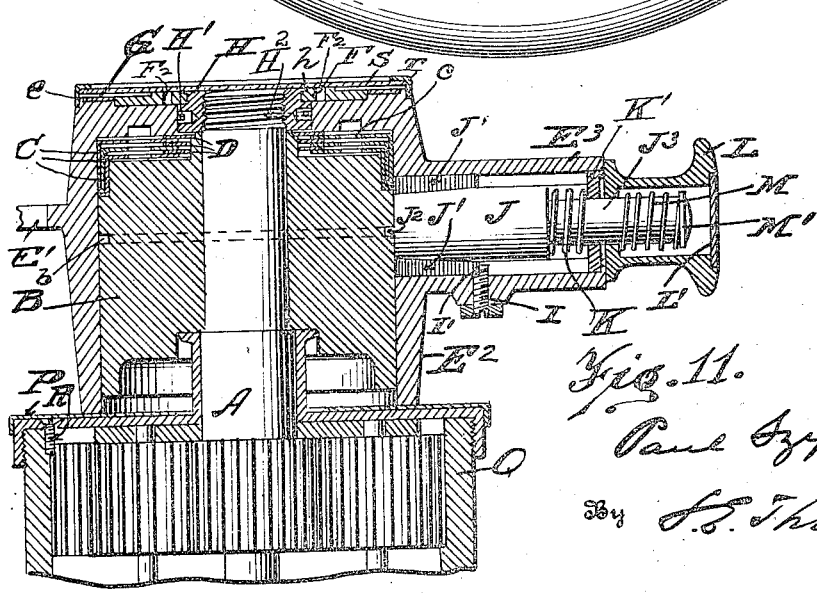
Fig. 11 is a vertical sectional view through the same.

In Figs. 10 and 11 the device is shown installed upon a well known type of steering gear and when used in connection therewith a cap P, is provided to overlap the cover of the planetary gear case Q, to particularly cover the screw R, extending downwardly from the cover of the gear case into the case itself in order that the screw R, which serves to secure the cover to the gear case, may not be removed by a maliciously inclined person when the steering wheel is free to turn upon the post;—and thus permit the removal of the device from the end of the post.

Having indicated the several parts by reference letters, the construction and operation of the device will be readily understood.

It will first be assumed that the steering wheel is in locked relation to the steering post and that the owner of the vehicle is about to leave the same and desires to render the steering wheel inoperative to guide the car that it may not be driven away during his absence. To effect this result, the bolt J, is withdrawn from engagement with the enlarged head B, by grasping the knob L, and pulling it outwardly against the action of the spring K, until the end of the bolt is withdrawn from the enlarged head of the post. The wheel is then given a slight rotation which forces the rotation of the cup-shaped elements C, due to the swinging action of the respective lugs C², projecting into the arc-shaped slots of the elements C, thereby disarranging the slots C', in the side walls of the latter with respect to each other and their previous opposition with the slots B², in the enlarged head.

Thus the spring actuated bolts J, are held from returning to their former locked relation with the enlarged head of the steering post,—the steering wheel being free to turn however upon the post but having no control over the action of the latter. To prevent the removal of the steering wheel from the post while in its released relation to the latter, the projecting tongue J², on the end of the bolt J, is held in the peripheral groove b, in the enlarged head by the transverse bolt I, which serves as a stop for the end of the fin J', of the spring actuated bolt, and the bolt I, cannot be unscrewed while the end of the fin J', bears against the squared end of the bolt I.

To remove the bolt I, and thus release the spring actuated bolt J, for repairs, the bolt J, must be in locked relation with the enlarged head as when the steering wheel is adapted to control the steering post;—the end of the fin J', is then spaced from the squared end of the bolt I, and the latter may then be unscrewed and the spring actuated bolt withdrawn.

To effect a locking engagement between the steering wheel and the post, the several cup-shaped elements must first be shifted so that the slots C', in their side walls register with each other and in opposition to the slot B², in the enlarged head.

This result is secured through the action of the respective lugs C², integral with the elements C, and extending into the slot c, in the adjacent element, and the arc-shaped channels E², in the hub of the steering wheel. The arbitrary degree of rotation of the several cup-shaped elements is determined through the adjustment of the graduated ring G, and disk F, with respect to each other in a manner well understood.

Upon the slots C', of the cup-shaped elements being brought into opposition with the slots B², of the enlarged head, the spring actuated bolts J, will enter the holes B', in the enlarged head, thereby locking the steering wheel in operative relation to the post.

By tapering the outer walls of the hub of the steering wheel, a wrench or other like tool cannot be applied thereto to cause the wall of the hub to sufficiently impinge upon the enlarged head of the post to secure steering action.

To insure against the action of a mischievously inclined person who may seek to strike the end of the spring actuated bolt with a hammer for the purpose of driving or indenting its opposite end in the wall of the enlarged head, I have provided a spring actuated knob L, as shown in my former patent before referred to, which while adapted for the withdrawal of the bolt, serves to protect the outer end of the bolt from the blows of a hammer or other instrument.

The graduations on the disk and annular ring, may be easily read at night by coating the same or forming the graduations with any of the well known luminous agents used on watch dials or clocks, for this purpose. The graduated disk and ring are protected by a suitable "crystal" S, inclosed by a frame T, secured to the hub by a bayonet fastening V,—see Figs. 3 and 8.

The holes F², in the disk F, are provided for lubricating the parts and also to apply a spanner wrench for changing the "combination."

Having thus described my invention, what I claim is:—

1. In a device of the character described, a steering post having an enlarged head provided with a transverse hole and longitudinal grooves opening into the latter and with a peripheral groove in alinement with the axis of said transverse hole, a steering wheel with its hub sleeved upon the enlarged head of the post, a spring actuated bolt having a tongue adapted to project into the peripheral groove of the enlarged head and radial fins extending into said longitudinal grooves, supported by a sleeve integral with the hub, a bolt extending transversely through the wall of said sleeve to limit the withdrawal of the spring actuated bolt and to be itself held against removal from the sleeve by the spring actuated bolt when in abutting relation to each other, and means actuated by the steering wheel when released from control of the post to control the entry of the spring actuated bolt into locking relation with the post.

2. In a device of the character described, a steering post provided with an enlarged head, having a transverse hole with radial slots and a peripheral groove, a steering wheel provided with a hub fitted to the enlarged head of the post and having arc-shaped channels on the inner face of the hub, a plurality of independently operated cup-shaped rotatable elements mounted on the head of the post having arc-shaped slots of varying length and provided with upstanding lugs respectively extending into the arc-shaped slot of the overlapping element with the lug on the top element projecting into the arc-shaped channel of the hub, a spring actuated bolt having fins extending into the radial slots of the transverse hole and with a tongue adapted to traverse the peripheral groove in the enlarged head, means for limiting the withdrawal of said bolt, graduated elements respectively secured to the hub and to the post adapted to coördinate, whereby the openings in the rotatable elements may be adjusted to register with the transverse opening in the head that the spring actuated bolt may lock the steering wheel to the post.

3. In a device of the character described, a steering post, a steering wheel having a hub mounted upon the steering post, a bolt carried by the wheel and adapted to lock the same to the post, means for controlling the entry of the bolt into locking relation with the post, an annular graduated ring lodged in an annular recess formed in the top of said hub, a circular nut screwed to the end of the steering post and having its outer edge "burred" to overlap the graduated annular ring, a graduated ring secured to the hub rotatable concentrically to said annular ring, a transparent cover, an inclosing frame, and means for securing the cover to the hub.

4. In a device of the character described, a steering wheel, its hub sleeved upon the post, a spring actuated bolt carried by the hub of the steering wheel to lock the wheel in operative relation to the post, means for controlling the entry of said bolt into locked relation to the post, a nut screwed to the post, an annular wire spring lodged in said nut, having an inwardly directed end extending through the nut, whereby it may impinge upon the threads of the post to secure the nut when adjusted, a graduated ring flush with the face of the nut and secured to the nut by burring the edge of the latter when assembled, and a coacting graduated concentrically arranged ring secured to the hub of the steering wheel to rotate therewith.

In testimony whereof I sign this specification in the presence of two witnesses.

PAUL SZYDLOWSKI.

Witnesses:
  S. E. THOMAS,
  E. A. BOYKO.